United States Patent [19]

Bianchi et al.

[11] 4,044,236

[45] Aug. 23, 1977

[54] METHOD AND APPARATUS FOR CONTROLLING THE OPERATION OF AN INTERNAL COMBUSTION ENGINE

[75] Inventors: Valerio Bianchi, Hochdorf; Peter Schmidt, Schwieberdingen; Reinhard Latsch, Vaihingen, all of Germany

[73] Assignee: Robert Bosch GmbH, Stuttgart, Germany

[21] Appl. No.: 659,538

[22] Filed: Feb. 19, 1976

[30] Foreign Application Priority Data

Feb. 19, 1975 Germany .............................. 2507137

[51] Int. Cl.² .......................... G06F 15/20; F02D 5/00
[52] U.S. Cl. ............................ 235/150.21; 123/32 EA
[58] Field of Search .............. 235/150.21; 123/32 EA, 123/32 AE

[56] References Cited

U.S. PATENT DOCUMENTS

| | | | |
|---|---|---|---|
| 3,789,816 | 2/1974 | Taplin et al. ............... | 123/32 EA X |
| 3,820,198 | 6/1974 | Scofield ....................... | 123/32 EA |
| 3,863,054 | 1/1975 | Monpetit ..................... | 235/150.21 |
| 3,927,304 | 12/1975 | Wentworth et al. .......... | 235/150.21 |
| 3,953,716 | 4/1976 | Monpetit ..................... | 235/150.21 |

*Primary Examiner*—Jerry Smith
*Attorney, Agent, or Firm*—Edwin E. Greigg

[57] ABSTRACT

The operation of an internal combustion engine in the region of its lean-running limit is controlled on the basis of engine roughness as measured by an inductive crankshaft transducer. Its periodic signal gates the counting in a digital down-counter, from a pre-set number, at a frequency proportional to r.p.m. The content of the down counter is counted up or down in a subsequent up-down counter depending on the value of its own most significant bit which indicates the algebraic sign of the phase comparison between the transducer frequency and the r.p.m.-proportional frequency. Two digital integrating stages eliminate effects due to constant engine acceleration. A decoder supplies a control signal to a final control element for fuel, air or exhaust control.

12 Claims, 3 Drawing Figures ns is a further object of the invention to provide a method and an apparatus for deriving from this measurement a suitable control signal.

METHOD AND APPARATUS FOR CONTROLLING THE OPERATION OF AN INTERNAL COMBUSTION ENGINE

BACKGROUND OF THE INVENTION

The invention relates to a method and an apparatus for controlling the operational behavior of an internal combustion engine in a predetermined domain of operation. The control process includes measuring the dispersion of cyclic fluctuations of the mean combustion chamber pressure in time intervals which are synchronous with the engine r.p.m. Based on the results of this measurement, the fuel-air mixture and/or the quantity of recycled exhaust gas is changed. An electrical signal corresponding to the non-uniform operation of the engine and an artificial signal identifying the uniform operation of the engine are compared and the phase relation of these two signals is used as a measure of the controlled variable.

At the present time, great effort is expended to permit the operation of internal combustion engines in a domain in which the exhaust gases are free of noxious components and/or fuel consumption is as small as possible so as to comply with increasingly stringent regulations regarding exhaust gas concentrations and to take account of the overall fuel supply situation.

One possibility is to operate the engine with as lean a fuel-air mixture as possible, i.e., to adjust the engine in the direction of a lean mixture, because, in that region, one may respect a relatively innocuous exhaust gas and low fuel consumption although the concentration of nitrogen oxide increases. For this reason, it is of great significance to know as precisely as possible what the lean running limit of the engine is. This determination may be made, for example, on the basis of the fluctuations of the pressure in the cylinders of the engine. It is known that an internal combustion engine runs less smoothly the farther away its operation is from a stoichiometric fuel-air ratio (air number $\lambda = 1$).

When this phenomenon is subjected to a detailed analysis, it is seen that the individual pressure fluctuations depend on uncontrollable operational parameters of the engine, namely on fluctuations in the air number, charge and air turbulences and similar influences. When the combustion chamber pressure is measured as an instantaneous value as a function of the angular speed of the crankshaft, there are further disturbing effects, for example due to oscillating masses of the crankshaft, unevenness of the roadway or other forces which have an effect on the engine block of the internal combustion engine. Thus, it is impossible to use the phenomenon of smooth running of an engine to obtain a suitable control variable because the superimposed fluctuations and disturbances are a hindrance. These disturbances could, in principle, be filtered out with low-pass or other filters, but even the use of filters is problematical because the engine is to be used in a wider r.p.m. domain. It is difficult to find suitable filters for both high and low frequencies.

SUMMARY OF THE INVENTION

It is a principal object of the invention to provide a method and an apparatus for controlling an internal combustion engine in a predetermined operational domain by determining pressure fluctuations due exclusively to the arrival at a predetermined operational point at the so-called lean-running limit of the engine. It is a further object of the invention to provide a method and an apparatus for deriving from this measurement a suitable control signal.

These objects are attained, according to the invention, by using the information in the above-described smooth running phenomenon and by providing a digital counter with a digital pulse train of variable frequency proportional to engine r.p.m. This pulse train is derived by a double integration of the signal from the above-described phase comparison. The counter is further provided with a start and stop signal for the counting process and this actual pulse train is derived from the non-uniform running of the engine and has a frequency substantially less than the first-named pulse train. At a rate determined by the actual pulse train, the content of the counter is fed to a subsequent up-down counter for performing the phase comparison mentioned above. The contents of the up-down counter are counted down at a constant clock frequency $f_o$ so as to generate a signal which is proportional to the revolutionary period of the crankshaft.

A substantial advantage to be derived from this method and apparatus is that the use of digital procedures and technology permits the generation of a precise control signal from the smooth-running characteristics of the engine, where the signal is proportional to the mean pressure fluctuations of a cylinder. This control signal can then be used in a control loop for adjusting the fuel-air mixture and/or the recycle rate of the exhaust gas. Such a digital phase control loop for smooth-running control is of further advantage, because the individual circuit elements are available in miniaturized form as integrated circuits and thus the expense for the practical embodiment of such a control is not high.

The invention will be better understood as well as further objects and advantages thereof become more apparent from the following detailed description of an exemplary embodiment taken in conjunction with the drawing.

DESCRIPTION OF THE PREFERRED EMBODIMENT

The operation of an internal combustion engine, at least some of the time, in a region adjacent to its lean-running limit, in which, by definition, there is a first occurrence of delayed combustion phenomena, requires the availability of a control signal proportional to the mean pressure fluctuations. Since the pressure fluctuations in the combustion chambers of the cylinders are not readily accessible for measurement, they are determined indirectly by measuring, instead, fluctuations in the engine torque, i.e., changes in the angular speed of the engine crankshaft. In particular, the periods of revolution of the crankshaft between two well-defined angular positions are measured. The changes in the period of revolution then permits a derivation of a control variable related to the mean pressure fluctuation.

It should be noted, in general, that when the engine operates at or near the lean-running limit, its fuel consumption is usually significantly less than that in a domain of operation where the fuel mixture is stoichiometric or nearly stoichiometric (air number λ approximately = 1).

A definite leaning out of the mixture supplied to the engine generally leads to a reduction of the gas throughout rate in the combustion chamber so that the combustion process is displaced from the vicinity of the top-dead-center position of the piston into the power stroke domain. For this reason, the cyclic fluctuations of the combustion process and, hence, also of the engine, torque, increase, so that, when the load is constant, the usually relatively uniform fluctuations of the angular speed of the crankshaft become increasingly irregular.

Figure 1:
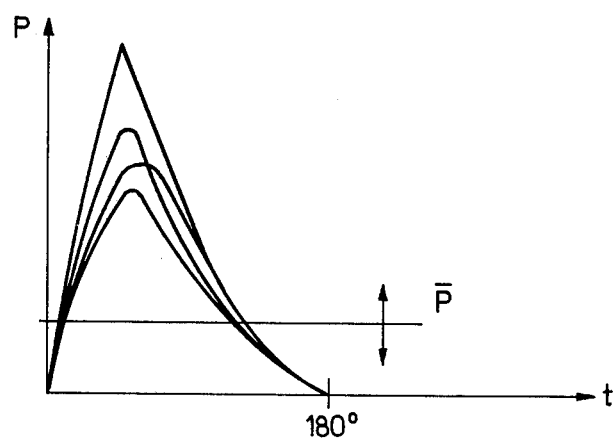
FIG. 1 is a diagram showing the pressure in a cylinder of an internal combustion engine as a function of time.

Turning now to FIG. 1, it will be seen that the pressure in a cylinder increases relatively rapidly, passes through a maximum and then decreases quite rapidly. It is also seen that substantial fluctuations occur, which have an effect on the angular speed of the crankshaft. Due to these fluctuations of the pressure, illustrated in FIG. 1, measures of the instantaneous combustion chamber pressure are not suitable to provide a stable control over the operation of the engine.

However, when the area underneath the individual curves is integrated, one can obtain a mean combustion chamber pressure $\bar{P}$, which itself varies depending on the composition of the fuel-air mixture. It is these dispersions of the cyclic fluctuations of the mean combustion chamber pressure which are examined in predetermined time intervals and from which a control magnitude is derived for controlling the operational behavior of the engine.

As has been explained above, these fluctuations of the mean combustion chamber pressure, or the mean pressure fluctuations, are determined by measuring the resulting torque fluctuations of the crankshaft in the form of changes in the angular speed or the period of revolution.

Figure 2:
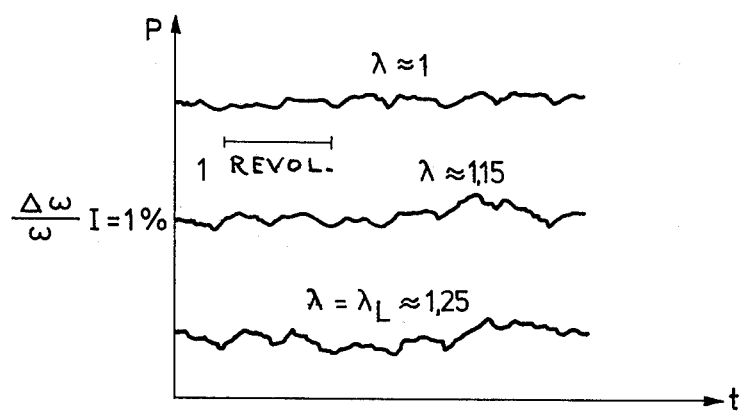
FIG. 2 shows the changes in the angular speed as a function of the composition of the fuel-air mixture.

FIG. 2 is a diagram of the normalized changes in the angular speed of the crankshaft as a function of time. The upper curve is drawn for an air number λ = 1 (stoichiometric mixture), the middle curve corresponds to an air number λ approximately 1.15 and the lower curve an air number λ approximately 1.25. It may be recognized that the fluctuations of the angular speed of the crankshaft or the changes in the period of revolution become larger with increasing air number, i.e., with a leaner mixture.

The control process takes place as follows. Presupposing a maximum mean pressure fluctuation for an appropriate lean mixture, one uses the fluctuations in the angular speed to obtain an angular signal which is compared with a comparison system not subject to any fluctuations. The difference in angle between these two signals can serve as a measure for the control variable. The engine is then permitted to run at the fuel-air mixture corresponding to the desired air number so that the measured angle reaches a predetermined value. In order to determine what the angle is, or else to determine the change in the period of revolution, for example between two subsequent crankshaft revolutions, the time elapsed between the passage of markers on the crankshaft is measured. The comparison system has no fluctuations and it is simulated electronically with digital circuitry. It runs at a frequency which is synchronous with the basic r.p.m. of the crankshaft but does not have the above-mentioned cyclic fluctuations. In this manner, one obtains a phase relationship between the signal train from the measurement of the period of revolution which will henceforth be referred to as an actual pulse train and the uniform simulated pulse train.

The circuit used to embody the invention must not respond to deliberate changes in the period of revolution, for example during acceleration or braking of the engine which occurs almost all the time. Furthermore, the control signal must not be proportional to the change in the period of revolution but rather must be proportional to the mean pressure fluctuation, which requires multiplying a signal related to changes in revolution time by a signal proportional to r.p.m.

Figure 3:
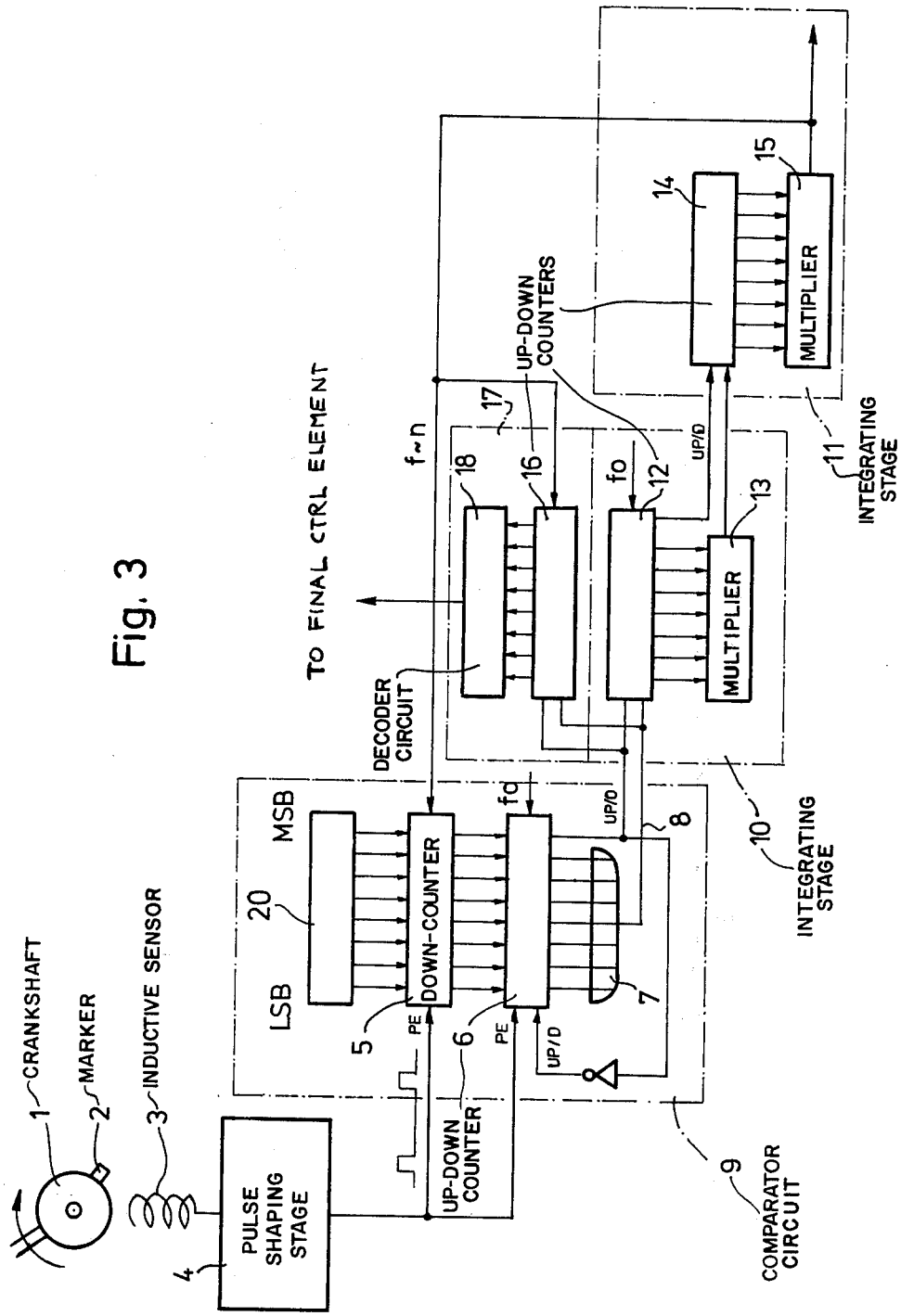
FIG. 3 is a block diagram of a digital control circuit for finding the phase angle and for deriving an appropriate control signal proportional to the mean pressure fluctuation.

FIG. 3 is a schematic diagram of a digital circuit which uses the actual pulse train derived from the passage of the crankshaft marker past a sensor to derive a control signal proportional to the mean pressure fluctuations in the combustion chamber.

Mounted on a crankshaft 1 is a marker 2 which passes, for example, an inductive sensor 3 in which it induces an electrical signal. The induced signal is fed to a pulse shaping stage 4 for shaping and normalizing and is a controlling actual pulse train for a down-counter 5 which, in the present exemplary embodiment, acts as an oscillator to produce the artificial smooth running signal not subject to any actual engine fluctuations. Whenever a pulse from the actual pulse train from the pulse shaper stage 4 arrives in the down-counter, the relatively high numerical content of a predisposed circuit 20 containing a high multiplicative factor is jammed into the down-counter. In the interval between two pulses from the actual pulse train, the down-counter 5 is then counted down under the control of a variable system clock frequency $f$ whose origin will be discussed below. In this connection, it should be mentioned that, as per general convention, the digital counters, multipliers, etc. are shown with the most significant bits on the right and the least significant bits on the left in the figure (MSB and LSB).

When the next pulse of the actual pulse train from the pulse shaping stage 4 arrives, the content of the down-counter 5 is transferred to a subsequent up-down counter 6. At the same time, as described above, the down-counter 5 again receives the multiplication factor from the input circuit 6 and is counted down again as already described. In other words, the actual pulse train whose pulses occur proportional to r.p.m. are translated in the down-counter 5 into a pulse train of substantially higher frequency which thus serves as an oscillator for generating a signal that simulates the uniform running of the engine.

Depending on when the next pulse from the actual pulse train arrives, the down-counter will have remaining in it a very small or a very large number depending on whether it reached 0 and reset itself to its initial maximum value for a second countdown. From this situation, the algebraic sign of the change in period of revolution can be derived because, when a logical 1 is present as the most significant bit in the up-down counter 6, then the down counter 5 has been counted down too fast (based on the period between two pulses of the actual pulse train) while, when a 0 occurs there, the down counter was counted down too slowly. Thus the most significant bit, firstly, yields the algebraic sign of the signal related to the change in the period of revolution and that signal is designated in FIG. 3 as UP/D (up-down signal) because this signal also indicates in which direction the up-down counter 6 should be counted down by the constant system clock frequency $f_o$.

In a practical exemplary embodiment, if the up-down counter 6 contains a large number (MSB = 1) it is counted in the up direction, whereas, if it contains a small number (MSB = 0), it is counted down. The control of the counting process in the up-down counter 6 is performed by the pulses of the actual pulse train, while the counting frequency occurs at the constant clock frequency $f_o$. As a consequence, the duration of the counting process is proportional to the "error" and is a measure of the change in the period of revolution. A signal which inherently defines the duration of this change in the period of revolution is obtained by connecting the up-down counter 6, for example, with an OR gate 7, whose output is, for example, high as long as the counting process in the up-down counter 6 continues. Thus, the overall phase comparator circuit 9 has two output channels which give the amount and algebraic sign of the change in the period of revolution.

Hence, the comparator circuit 9 permits a comparison of the engine period and the internal frequency. The signal which now contains the magnitude and algebraic sign of the change in the period of revolution is then fed to two integrating stages 10 and 11 which eliminate the effects of linear accelerations or decelerations. The integration is performed by counters. In principle, each counter is also an integrator because it sums signals.

The first integration stage has a further up-down counter 12 which counts a system clock frequency $f_o$ in a manner determined by the duration and algebraic sign of the control signal. The content of the up-down counter 12 serves as the multiplication factor for a subsequent multiplier 13 which generates a frequency proportional to the content of the up-down counter 12. Such a multiplier is a known digital integrated circuit which has its own clock frequency or may be supplied with a clock frequency and which is capable of changing a linear numerical value, or a pulse width, into a frequency. Thus, the integrating stage 10 is supplied with a frequency or a pulse width and generates a frequency for a second integrating stage 11 and for the up-down counter 14 contained therein. The algebraic sign (and hence the indication in which direction counting is to take place) is supplied to the up-down counter 14 via a second channel directly from the preceding up-down counter 12. Thus, depending on the algebraic sign, the multiplier 13 introduces a count frequency to the up-down counter 14. The content of the up-down counter 14 is fed to a subsequent multiplier 15 which again generates a frequency proportional to the content of the up-down counter 14.

At the final output of these two integrating stages 10 and 11, one then obtains a frequency proportional to r.p.m. which is used as the counting frequency for the above-mentioned down counter 5. Thus, the whole circuit acts as a kind of phase control loop which has become known, especially in the English language literature, as a phase locked loop (PLL) and in which a double integration takes place. The actual control signal is derived from the signal indicating the change in the period of revolution which is present at the output of the phase comparator 9 where its sign and magnitude are already known, but it must be fed to a further up-down counter 16 so as to permit multiplication with an r.p.m. proportional signal. In the present exemplary embodiment, this signal has the frequency $f$ so that the change in the period of revolution which corresponds to the value $$\frac{\Delta (\Delta T)}{T^2}$$

is changed to the value of the mean pressure fluctuation corresponding to $$\frac{\Delta (\Delta T)}{T^3}.$$

This further circuit 17 containing the up-down counter 16 is independent from the phase control loop and serves only to obtain the final adjustment signal. For this purpose, a known decoder circuit 18 is connected to the output of the up-down counter 16. The circuit 17 processes the signal in such a manner that the up-down counter 16 counts the same frequency $f$, which is also supplied to the down counter 5, depending on the algebraic sign of the signal related to the change in the period of revolution and in dependence on its magnitude.

The output signal from the decoder 18 may be supplied to a comparator, for example an operational amplifier whose other input is supplied with the command value generator of the control loop. The further processing may, however, also be purely digital. A command value may be generated in analog fashion by a simple resistive voltage divider. The output of the operational amplifier acting as a comparator may be immediately fed to a final element, for example a bistable flip-flop. This element may then engage, for example, an electronically controlled fuel injection system and may lengthen or shorten the fuel injection pulses so as to change the composition of the fuel-air mixture. On the other hand, the setting signal may also open or close an exhaust gas recycle valve.

What is claimed is:

1. A method for obtaining a signal for controlling the operation of an internal combustion engine, said engine including a rotating crankshaft, comprising the steps of:
    sensing the rotation of the crankshaft and generating a first signal representative of the irregularities of crankshaft motion;
    deriving a pulse signal from said first signal;
    generating a second signal representative of a regularly rotating crankshaft;
    performing a phase comparison between said first signal and said second signal;
    generating a second pulse train of variable frequency from the twice-integrated results of said phase comparison;
    applying said second pulse train to the counting input of a down counter circuit;
    gating said down counter circuit by the first pulse train of a frequency substantially less than that of said second pulse train;
    supplying the contents of said down counter circuit to the jam of an up-down counter and gating said up-down counter by said first pulse train for counting at a constant system clock frequency; thereby performing said phase comparison and generating a datum whose duration is proportional to changes in the period of rotation of the crankshaft.

2. A method as defined by claim 1, comprising the further steps of double integration of said datum, thereby generating said second pulse train.

3. A method as defined by claim 1, comprising the further steps of gating a second up-down counter with said datum and supplying it with a counting frequency equal to said second pulse train; thereby performing a multiplication of said datum by an rpm-dependent frequency.

4. An apparatus for obtaining a signal for controlling the operation of an internal combustion engine which includes a rotating crankshaft and a signal generator for generating a first pulse train indicative of crankshaft motion, the apparatus comprising:
 means for generating a second pulse train proportional to and synchronous with crankshaft rpm;
 phase comparator circuit means supplied with said first and said second pulse trains; and
 two cascaded integrating circuit means, connected behind said phase comparator circuit means.

5. An apparatus as defined by claim 4, wherein said signal generator includes marker means attached to said crankshaft, electro-inductive pulse generator means and a pulse shaping circuit for generating said first pulse train.

6. An apparatus as defined by claim 4, wherein said phase comparator means includes a down counter gated by said first pulse train and a pre-set circuit for pre-setting said down counter, an up-down counter connected behind said down counter for receiving the contents of said down counter and a source of constant system clock frequency for clocking said up-down counter.

7. An apparatus as defined by claim 6, further including an OR-gate connected after said up-down counter for determining the duration of the count in said up-down counter and thereby producing a measure of the change in period of rotation of the crankshaft, said measure and the most significant bits of said up-down counter are delivered to a subsequent integrator circuit.

8. An apparatus as defined by claim 7, wherein said integrator circuit includes a second up-down counter clocked as constant system frequency and gated by the magnitude and sign of the measure from said phase comparator circuit defining changes in the period of crankshaft rotation.

9. An apparatus as defined by claim 8, further including a multiplier circuit connected after said second up-down counter in said first integrating circuit and connected to receive the contents of said second up-down counter for producing a periodic signal and a second integrating circuit connected to receive said periodic signal.

10. An apparatus as defined by claim 9, wherein said second integrating circuit includes a third up-down counter connected to receive said periodic pulses from said multiplier and further including a second multiplier connected to said third up-down counter for transforming the content of said third up-down counter into said second pulse train connected to said down counter in said phase comparison circuit; whereby said second pulse train is proportional to rpm and is derived from double integration of the change in period of crankshaft rotation.

11. An apparatus as defined by claim 10, further comprising a fourth up-down counter and a subsequent decoder circuit, said fourth up-down counter being gated by the output signal from said phase comparator circuit indicating changes in the period of crankshaft rotation and being clocked by said second pulse train formed at the output of said second multiplier; whereby said fourth up-down counter performs a multiplication of the signal indicating changes in the period of crankshaft rotation with a number proportional to engine rpm.

12. An apparatus as defined by claim 11, further comprising comparator means connected to the output of said decoder by one input and receiving at its second input a set-point signal, for providing an output control command for controlling the fuel-air ratio of the internal combustion engine.

* * * * *